May 10, 1927.
C. W. CLARK
1,628,578
VEHICLE WHEEL
Filed July 2, 1925
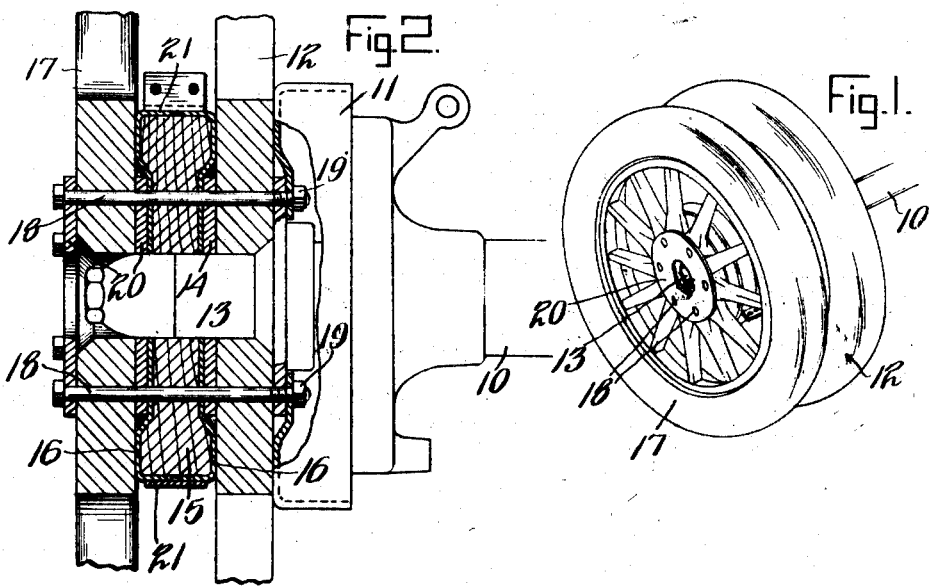
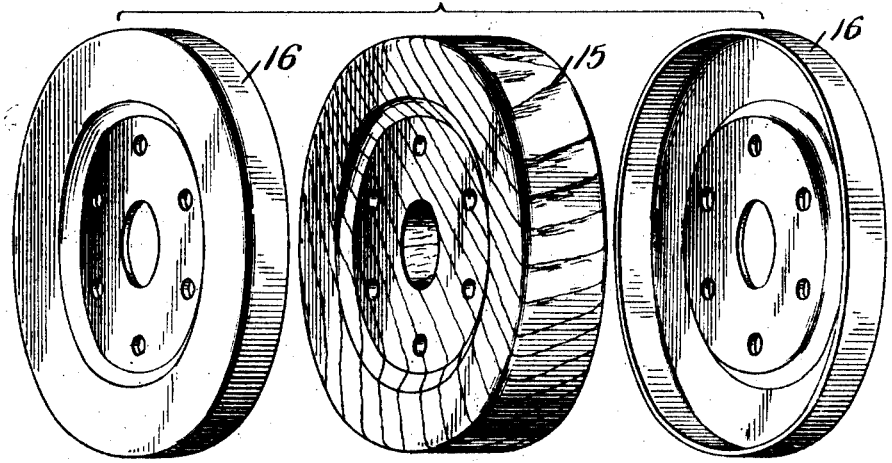
Inventor
Claude W. Clark
By
Attorney Patented May 10, 1927.

1,628,578

UNITED STATES PATENT OFFICE.

CLAUDE W. CLARK, OF WEST PALM BEACH, FLORIDA.

VEHICLE WHEEL.

Application filed July 2, 1926. Serial No. 120,232.

My said invention relates to wheels for vehicles such as trucks, busses and the like, and more particularly to a means for mounting additional wheels adjacent to the ones ordinarily provided, for the purpose of carrying heavier loads.

The ordinary light truck is provided with single rear wheels which are suitable for the capacity of the truck when on city streets or hard smooth roadways, but when sandy or muddy roads are encountered the single wheels cut into the surface causing delays and often damage to the vehicle. It is therefore an object of my invention to provide a simple and inexpensive dual wheel construction which will afford double the tractive surface and eliminate the danger of the truck becoming mired in sand or mud.

Referring to the accompanying drawings which are made a part hereof and on which similar reference characters indicate similar parts, Figure 1 is a perspective view of a dual wheel constructed in accordance with my invention.

Figure 2, a sectional view through the hub thereof, and

Figure 3, a composite perspective view of the members constituting the spacing block.

In the drawings, reference character 10 designates the axle housing, 11 the brake drum, 12 the ordinary wheel, 13 the hub and 14 the outside plate or washer, all of a standard construction of a well-known make of automobile and represented in light lines in Figure 2 of the drawings. In the structure described, short bolts pass through openings in the members 14, 12 and 11 and securely hold the parts together. In carrying out my improvement, I remove the short bolts referred to and substitute longer ones to be hereinafter more fully explained. A spacer composed of a circular block 15 of hard wood, or other appropriate material, incased in a pair of similarly shaped metal housings 16, is mounted on the hub 13 next to the wheel 12 and then a similar extra wheel 17 is also mounted on the same hub. Long bolts 18 are then passed through openings formed in the wheels and spacer and through the customary openings in the flange of the brake drum where they receive nuts 19 which hold the various parts together to form a rigid double-wheel structure. The bolts pass through disks or washers 20 which are interposed between the wheels and spacer to form a solid hub. A band 21 surrounds the flanges of the housings 16 to protect the core or block 15 and to prevent the flanges from spreading.

Although I have shown and described my improvement as applied to a well-known make of automobile, I wish to have it understood that it may be applied to other makes and possess the same advantages and therefore I do not limit myself to what is shown in the drawings and described in the specification but only as indicated in the appended claims.

Having thus fully described my said invention, what I claim as new and desire to secure by Letters Patent, is:

1. A dual wheel for vehicles comprising the normal wheel and its hub, a spacing block mounted on said hub, a second wheel mounted on said hub, perforated disks between said wheels and said spacing block, and bolts passing through said perforated disks, wheels and spacer to form a unit thereof, substantially as set forth.

2. A spacing block for dual wheels comprising a disk of fibrous substance, a pair of pressed metal housings snugly enclosing said disk from opposite sides, and a retaining band encircling the circumference of said housings, substantially as set forth.

In witness whereof, I have hereunto set my hand at West Palm Beach, Florida, this twenty-eighth day of June, A. D. nineteen hundred and twenty-six.

CLAUDE W. CLARK.